United States Patent [19]
Huang

[11] Patent Number: 5,332,425
[45] Date of Patent: Jul. 26, 1994

[54] AIR PURIFIER

[75] Inventor: Ping Huang, Tainan Hsien, Taiwan

[73] Assignee: Hung Hsing Electric Co., Ltd., Tainan Hsien, Taiwan

[21] Appl. No.: 21,016

[22] Filed: Feb. 22, 1993

[51] Int. Cl.⁵ .............................................. B03C 3/41
[52] U.S. Cl. ....................................... 96/26; 96/57; 96/63; 96/88; 96/94; 96/97; 361/223
[58] Field of Search ............... 55/126, 129, 152, 131; 06/55, 57, 80, 58, 26, 60–63, 97, 88, 94, 16, 32; 95/69, 70, 77; 361/226, 230, 233, 235; 422/4, 5, 120

[56] References Cited

U.S. PATENT DOCUMENTS

| | | | |
|---|---|---|---|
| 2,209,798 | 7/1940 | Subkow | 96/97 X |
| 3,156,847 | 11/1964 | Schweriner | 96/97 X |
| 3,757,803 | 9/1973 | Chiang | 96/97 X |
| 3,768,258 | 10/1973 | Smith et al. | 96/97 X |
| 3,879,986 | 4/1975 | Sehmel | 96/97 X |
| 3,957,374 | 5/1976 | Kriese et al. | 96/97 X |
| 4,133,652 | 1/1979 | Ishikawa et al. | 96/58 |
| 4,541,847 | 9/1985 | Oie et al. | 96/58 |
| 4,597,781 | 7/1986 | Spector | 96/52 |
| 4,689,715 | 8/1987 | Halleck | 361/235 X |
| 4,772,297 | 9/1988 | Anzai | 96/19 |
| 5,055,115 | 10/1991 | Yikai et al. | 96/97 X |
| 5,065,272 | 11/1991 | Owen et al. | 96/97 X |

FOREIGN PATENT DOCUMENTS 848446 9/1960 United Kingdom .................. 96/97

Primary Examiner—Richard L. Chiesa
Attorney, Agent, or Firm—Morton J. Rosenberg; David I. Klein

[57] ABSTRACT

An air purifier is provided having a purifier housing and an air way housing mounted therein. A fan having a cylindrical whirlpool leaf construction is mounted within the air way housing and air is directed in a predetermined direction through an air exit opening formed in a wall of the purifier housing. An extended and tapered discharging copper needle is electrically coupled to a high voltage generator contained within the purifier housing and produces negative ions. The discharging needle is pointed in contour and has an apex end located adjacent the air exit opening. The discharging needle extends in the direction of the passage of high pressure air from the purifier housing which allows the discharging needle to vibrate responsive to the high pressure air flow and increases the amount of negative ions mixed with the air passing from the purifier housing.

1 Claim, 3 Drawing Sheets

AIR PURIFIER

BACKGROUND OF THE INVENTION

A conventional air purifier is shown in FIG. 6 and comprises a housing 11, a high voltage generator 12 and a discharging needle 13. The copper discharging needle 13 of the prior art is shaped as a cone and is coupled to the high voltage generator so that the needle 13 can discharge negative ions to be spread or mixed in air when high voltage electricity is provided by the generator 12. Consequently, the discharged negative ions in the air are increased for combining with positive ions resulting in a purification of the air. However, conventional air purifiers include a number of drawbacks including:

1. The discharging needle made of copper is shaped as a cone which limits the negative ions dispersement and lowers the purifying effect;
2. The discharging needle is immovably fixed to the front side of the housing, thus the dispersing negative ions discharge from the needle depends on movement of indoor air which may not reach around a room in which the purifier is placed;
3. Conventional purifiers do not generally clean and filter the air in a room before the discharge of negative ions and additionally, they do not force the air mixed with the negative ions to move around having a low air circulation dispersement.

SUMMARY OF THE INVENTION

The subject air purifier has been devised to offer an air purifier having the following improved features in addition to the features of conventional air purifiers:

1. A high voltage discharging needle is made of a very thin copper which can produce a large volume of ions considered healthful for human beings;
2. A conventional air purifier is static, however, the present air purifier produces a large volume of oxygen negative ions through the high voltage discharging needle being positioned at an air exit for increased circulation;
3. Air can be purified and cleaned by multi-layer filters provided in this purifier to force the air currents produced by a fan to mix with ions produced by the discharging needle to result in increased dispersion of the ions;
4. The subject air purifier produces a large volume of oxygen negative ions and also purifies the air to be blown out of the housing in a mix with the ions. Oxygen negative ions make dirt particulates negatively charge which are then attracted by positively charged or non-potential ground. Additionally, medical experiments have shown that oxygen negative ions are healthful to human beings possibly due to their sterilizing function.

DESCRIPTION OF THE PREFERRED EMBODIMENTS

Figure 1:
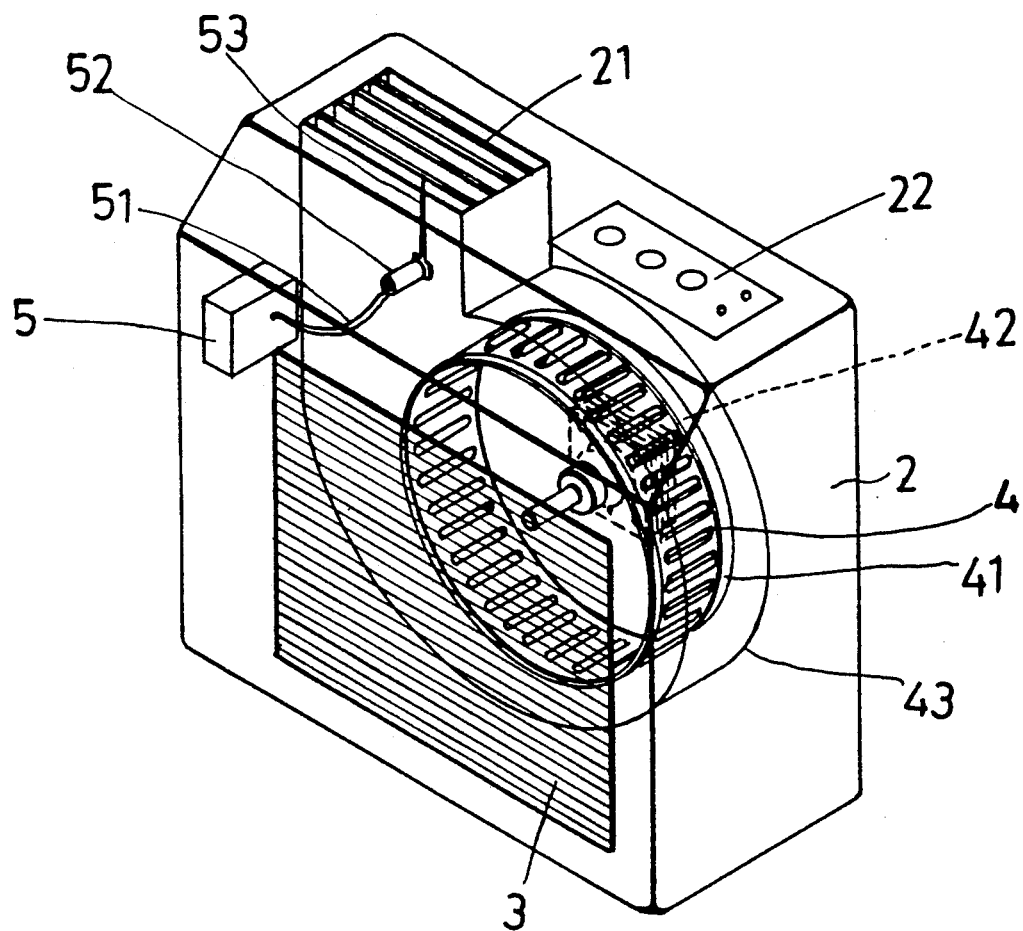
FIG. 1 is a perspective view of an air purifier of the present invention.
Figure 2:
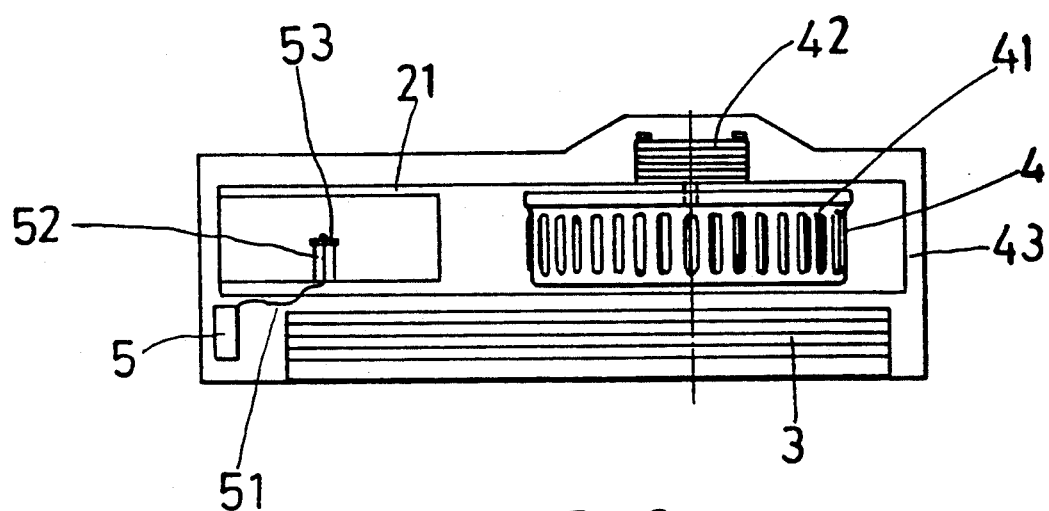
FIG. 2 is a plan view of the air purifier of the present invention.
Figure 3:
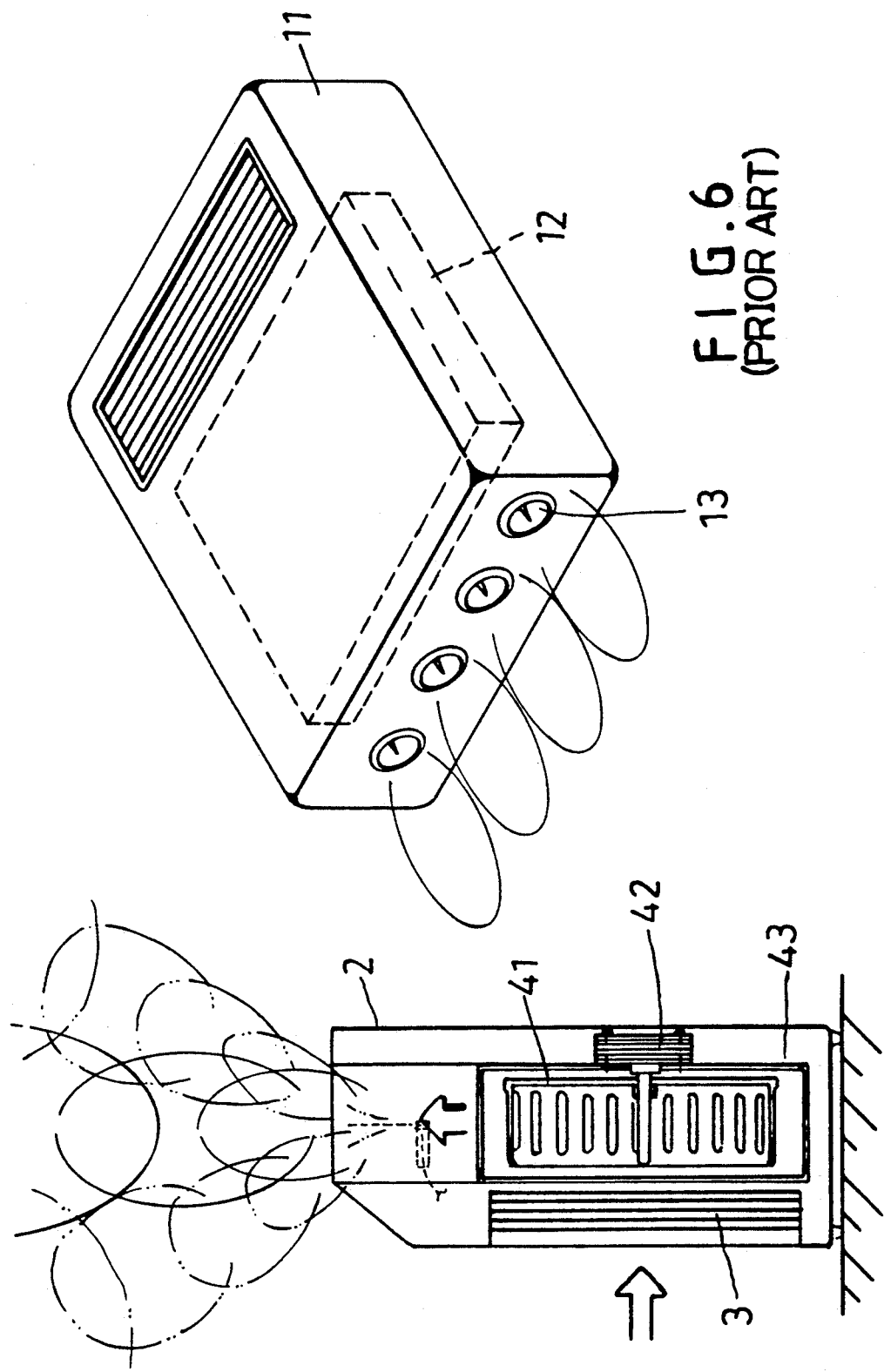
FIG. 3 is a side view of the air purifier of the present invention.

Referring now to FIGS. 1-3, there is shown an air purifier according to the present invention which includes a housing 2, a multi-layer filter unit 3, a fan 4, and a high voltage generator 5 being the main components of the air purifier.

The housing 2 is shaped or contoured for containing all components therein having a signal lamp section on an upper sloped side surface for mounting signal lamps having differing functions. An air exit 21 and an operating panel 22 is provided on the upper flat side surface of the housing 2 as shown.

The multi-layer filter unit 3 consists of a PE filter, a static dirt-collecting plate, a high voltage discharging plate, a static filter and an activated carbon filter combined into an overall unit 3. The PE filter filters comparatively large particles such as dirt, animal hairs, carpet woolen fabrics, pollen or like particles. A copper discharging plate causes micro particles in the air to become electrically positive so as to strengthen the attracting effect of the static filter and the static dirt-collecting plate. The static filter mainly gathers tiny positive particles and ionized particles whereas the activated carbon filter absorbs odiferous particulates. As the components of the multi-layer filter unit 3 are well-known in the art, such are not described and not included in the scope of the subject air purifier system.

The fan 4 has a cylindrical whirlpool leaf construction 41 and a motor 42, as well as an air way housing 43 containing the whirlpool leaf fan 41 to direct air through the air exit 21 in a predetermined direction from the housing 2.

Figure 4:
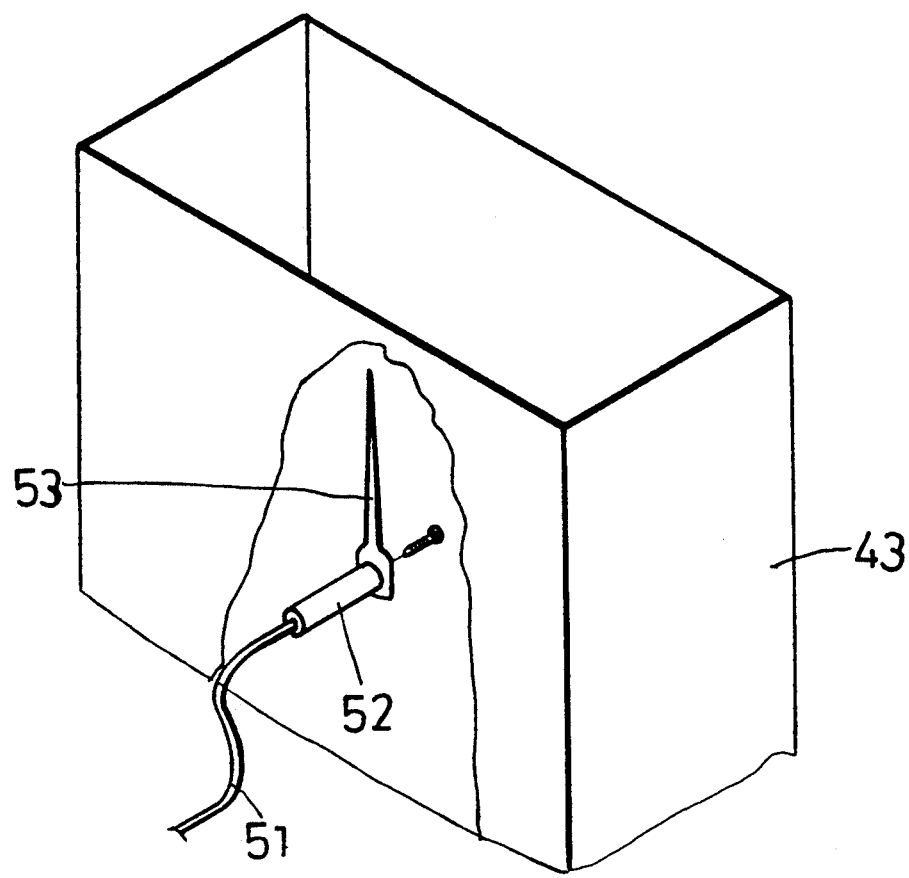
FIG. 4 is a perspective view partially cut away showing a high voltage discharging needle in the air purifier of the present invention.
Figure 5:
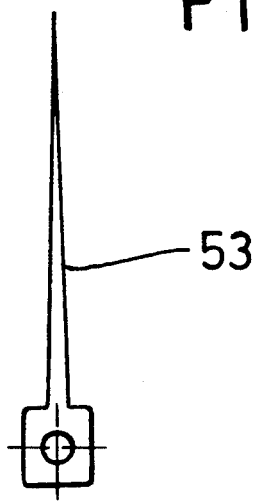
FIG. 5 is a front view of the high voltage discharging needle of the present invention; and, FIG. 6 is a perspective view of a prior art air purifier.

The high voltage generator 5 is provided to generate a high voltage and preferably approximates 7000 volts. The generator 5 is connected by a lead wire 51 to a discharging needle 53 fixed on the insulated rod 52. The discharging copper needle 53 is thinly shaped and tapered to a pointed end section shown in FIG. 5 being fixed in the same direction as that of the air exit 21 as shown in FIG. 4 and vibrates when the air is blown out of the exit 21 to enhance dispersion of negative ions.

While the preferred embodiments of the invention have been described above, it will be recognized and understood that various modifications may be made therein and that the appended Claims are intended to cover all such modifications which fall within the spirit and scope of the invention.

What is claimed is:

1. An air purifier comprising:
   (a) a purifier housing having an air exit opening formed through a wall thereof for passage of high pressure air therethrough in a predetermined direction;
   (b) an operating and display panel mounted on said purifier housing having a plurality of signal lamps;
   (c) a multi-layer filter unit mounted within said purifier housing for cleaning air contained within said purifier housing;
   (d) an air way housing mounted within said purifier housing for guiding said high pressure air through said air exit opening in said predetermined direction;

(e) a fan mounted within said air way housing, said fan having a cylindrical whirlpool fan leaf construction, said fan being rotatively coupled to a fan motor;

(f) a high voltage generator mounted within said purifier housing for generating a high voltage; and, (g) an extended and tapered discharging copper needle electrically coupled to said high voltage generator for producing negative ions, said discharging needle having an apex end and an opposing end fixedly coupled to an insulating rod, said apex end of said discharging needle being positionally located adjacent said air exit opening and said discharging needle extending in said predetermined direction to allow said discharging needle to vibrate responsive to the flow of said high pressure air for increasing the amount of said negative ions being mixed with said high pressure air passing from said purifier housing.

* * * * *